United States Patent
Solanki et al.

(10) Patent No.: US 7,204,935 B2
(45) Date of Patent: Apr. 17, 2007

(54) METHOD OF ETCHING A METALLIC FILM ON A SUBSTRATE

(75) Inventors: Rajendra Solanki, Portland, OR (US); Balu Pathangey, Phoenix, AZ (US)

(73) Assignee: Oregon Health & Science University, Portland, OR (US)

( * ) Notice: Subject to any disclaimer, the term of this patent is extended or adjusted under 35 U.S.C. 154(b) by 63 days.

(21) Appl. No.: 10/838,275

(22) Filed: May 4, 2004

(65) Prior Publication Data

US 2004/0200414 A1  Oct. 14, 2004

Related U.S. Application Data

(60) Division of application No. 10/081,426, filed on Feb. 22, 2002, now abandoned, which is a continuation-in-part of application No. 09/968,370, filed on Oct. 1, 2001, now abandoned.

(51) Int. Cl.
*C23F 1/00*   (2006.01)

(52) U.S. Cl. .............................. 216/75; 216/74; 216/58; 134/1.1; 134/26; 134/36

(58) Field of Classification Search ................ 216/74, 216/75; 252/79.1, 79.3; 134/1.1, 36, 26
See application file for complete search history.

(56) References Cited

U.S. PATENT DOCUMENTS

| | | | | |
|---|---|---|---|---|
| 5,505,322 | A | * | 4/1996 | Shinohara et al. ............. 216/78 |
| 5,993,679 | A | * | 11/1999 | Koide et al. ................... 216/74 |
| 6,008,140 | A | * | 12/1999 | Ye et al. ........................ 438/742 |
| 2001/0018922 | A1 | * | 9/2001 | Jolley ........................... 134/36 |

* cited by examiner

*Primary Examiner*—Shamim Ahmed
(74) *Attorney, Agent, or Firm*—Darby & Darby

(57) ABSTRACT

A method of etching a metallic film on a substrate. This method operates to inject an oxidizing agent through the use of a carrier gas to etch a source metal in the presence of a reducing agent such that the rate of etching can be controlled by controlling the flow rate of the carrier gas, the substrate temperature, the pulse widths of the oxidizing and reducing agents, and the number of etching phases.

8 Claims, 6 Drawing Sheets

Placing a substrate comprising an upper surface, a lower surface, and silicon in a reaction cell, wherein at least one of said surfaces is coated with a coating selected with from the group consisting of TaN, TiN, Ta, WN, WCN, TaSiN, and TiSiN

Injecting a source metal into the cell through the use of a carrier gas that is bubbled through water into the cell during a first pulse of 1-20 seconds duration

Injecting an inert gas into the cell during a second pulse of 1-10 seconds duration

Injecting a reducing agent into the cell during a third pulse of 1-10 seconds duration

Injecting an inert gas into the cell during a fourth pulse of 1-10 seconds duration

Figure 2

METHOD OF ETCHING A METALLIC FILM ON A SUBSTRATE

This application is a divisional of Ser. No. 10/081,426, filed on Feb. 22, 2002, now abandoned which is a continuation-in-part of application Ser. No. 09/968,370, filed on Oct. 1, 2001, now abandoned.

BACKGROUND OF THE INVENTION

1. Field of Invention

The present invention relates to a method of depositing a metallic film on a substrate using atomic layer deposition (ALD). This method uses a carrier gas to deposit a selected source metal on a substrate in a reaction chamber. Excess source metal is removed using a pulse of an inert gas such as nitrogen. A reducing agent is then pulsed into the reaction chamber followed by a pulse of purge gas such as nitrogen. This series of steps is then repeated for other selected source metals of interest, for each layer of source metal that is to be deposited onto the substrate. This process may be used for the deposition of conformal seed layers for subsequent electrodeposition of thicker films for microelectronic interconnect applications.

2. Description of The Prior Art

Electrodeposition of copper for the fabrication of microelectronic device interconnects has been used in the prior art. Prior to electrodeposition or electroplating, a wafer requires a thin layer of copper (Cu) which is known as a seed layer. Versions of sputtering have been employed in the prior art to deposit seed layers. As the dimensions of microelectronic devices shrink, new ways are needed of depositing a uniform seed layer in high aspect ratio trenches and vias of damascene structures. Prior art in the ALD of copper films consists of using a platinum under layer with hydrogen as a reducing agent, or elemental zinc vapor as a reducing agent. The copper film produced with these methods has high resistivity, rough texture, and contains large amounts of impurities. Hence, these methods are not suitable for microelectronic applications.

Chemical vapor deposition techniques have been used to deposit metallic substances, such as copper, on substrates. In CVD methods all of the reactants are present in the reaction chamber at a single time. In contrast to CVD methods, in ALD methods a single source metal is introduced into a reaction chamber at a given time for deposition. The deposition temperatures required for ALD are slightly less than those required for CVD. With the advent of nanotechnology, there is an increasing need to develop methods for depositing nanoscale metallic films on substrates for use in producing items such as state of the art microelectronic devices, circuit boards, and architectural coatings.

The present invention provides an ALD method for sequentially depositing monolayers of highly conformal, continuous smooth metallic films. The thickness of the deposition can be controlled by controlling the number of deposition cycles. The chemistry employed for ALD can also be used for CVD of metallic films, where are the chemicals will be introduced to the reaction cell at the same time.

SUMMARY OF INVENTION

An invention is described for conformally depositing nanoscale metallic films, such as copper, silver, gold, cobalt, or nickel using ALD of selected monolayers. Deposition of copper film is currently of significant interest for making interconnects in microelectronic devices because of its low resistivity that results in higher speed and its high resistance to electromigration that enhances its reliability. Other applications of copper include circuit board fabrication, catalyst preparation, and architectural coatings.

This invention uses a reaction between a reducing agent and a copper compound to produce a high purity, low resistance copper film over a wide range of substrates. The copper source can be hydrated (hexafluoroacetylacetonate) copper II ($Cu(hfac)_2 \cdot XH_2O$) or other copper beta-diketonates. These copper compounds can be reduced into metallic copper using a second chemical component that is referred to as a reducing agent. Several reducing agents were investigated of which ethanol, isopropanol, and formaldehyde based solution produced bright and shiny copper colored films. The formaldehyde based solution (combination of specific percentages of formaldehyde, water and alcohol) produced the best films with resistivites (~1.72 $\mu\Omega$-cm) close to bulk values (1.67 $\mu\Omega$-cm), as shown in FIG. 4, which is of extreme importance for the advanced ultra large scale integration (ULSI) fabrication.

A reducing agent and source metal are introduced into the reaction cell that contained the substrate. The substrate may be placed on a heated platform that could be heated up to 450° C.

The sources were transported with a carrier gas. The reducing agent was transported by a carrier gas that was bubbled through it. To transport $Cu (hfac)_2$, $H_2$ was first bubbled through water and then over the Cu compound.

The substrates include glass plates and silicon wafers that were coated with (blank or patterned) TaN, TiN, and Ta. Best film adhesion was achieved over TaN and Tin at about 300° C. However, at about 350° C., adhesion was excellent on all these substrates. Similar method can be adopted for other technologically important metallic thin films.

This technique was also utilized to deposit several other metallic films. High purity silver films were deposit on glass and Si coated with TaN, TiN, and Ta (patterned and blank) where Ag source was trimethylphosphine (hexafluoroacetylacetonate) Ag(I). The reducing agents were again alcohol and formaldehyde based solution, as described above. The resistivity of films were about 1.7 $\mu\Omega$-cm. Other metallic films that were similarly deposited include gold using $Me_2Au(hfac)$ and $Me_2Au(tfac)$, Pt from hexafluoroacetylacetonate Pt(II), and Co from hexfluoroacetylacetonate Co(III). The reducing agents were same mentioned above.

DESCRIPTION OF THE DRAWINGS

FIG. 2 is a block diagram of a first embodiment of the present invention.

DESCRIPTION OF THE PREFERRED EMBODIMENTS

Figure 1:
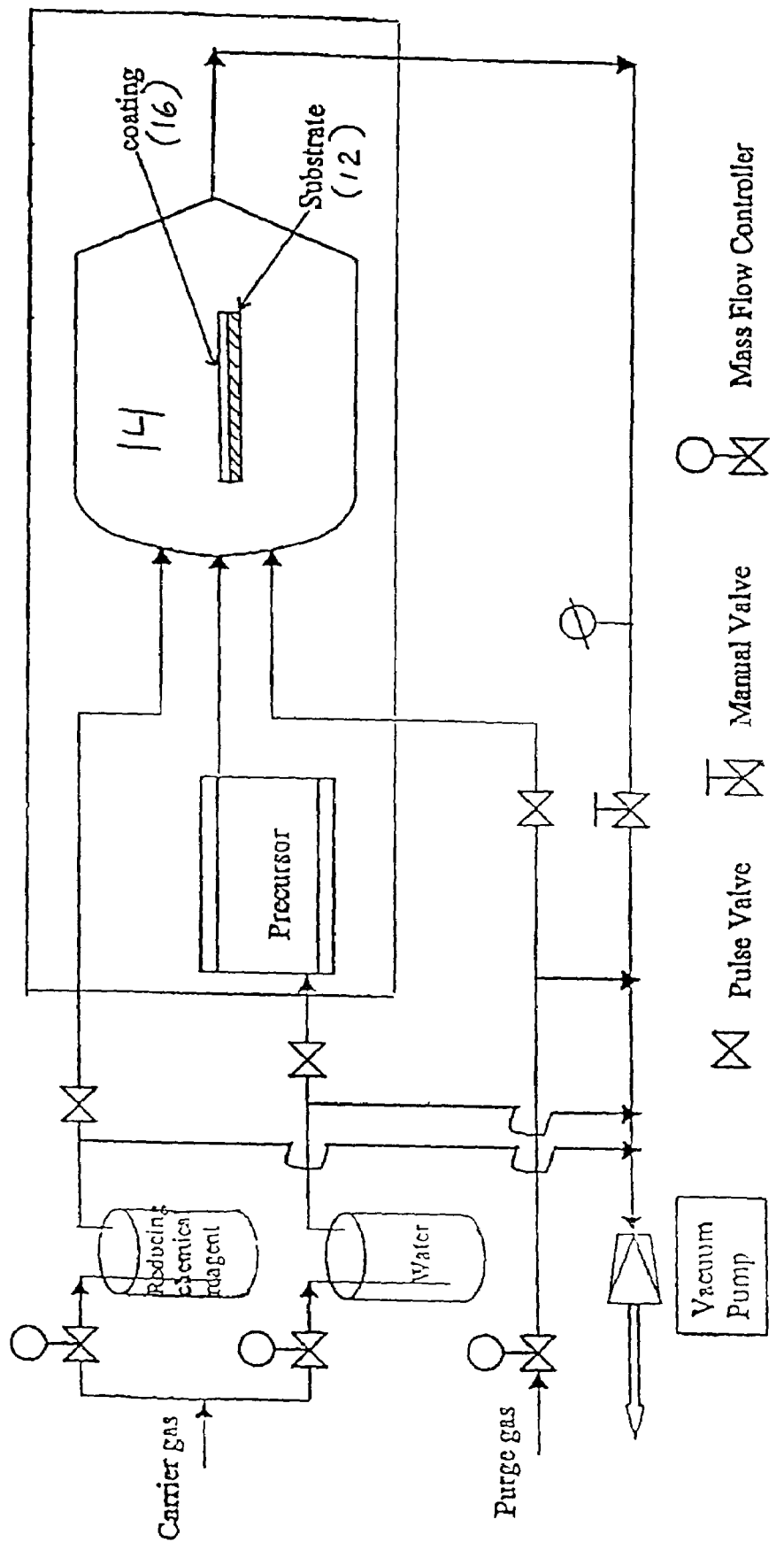
FIG. 1 is a flow diagram of one preferred embodiment of a system suitable for practicing the method of the present invention.

The present invention is directed toward an ALD method of depositing a metallic film on a substrate. This invention comprises placing a substrate 12 comprising an upper surface, a lower surface, and silicon in a reaction cell or chamber 14, wherein at least one of said surfaces is coated with a coating 16 selected from the group consisting of TaN, TiN, Ta, WN, WCN, TaSiN, and TiSiN, as shown in FIG. 1 and in block 10 of FIG. 2. In a preferred embodiment, the coating on the substrate is patterned. In one preferred embodiment, the reaction chamber is a Microchemistry F-120 ALD reactor.

In one preferred embodiment, the substrate is a silicon wafer. In another preferred embodiment, the substrate is a glass plate. In another preferred embodiment, the silicon wafers are precoated with a layer of $SiO_2$, having a thickness in the range of 5–100 nanometers followed by a six barrier layer comprising Ta, TaN, or TiN having a thickness in the range of 5–100 nanometers. In another preferred embodiment, the substrate is placed on a heated platform. In another preferred embodiment the substrate is heated to a temperature of at least 150° C.

The invention further comprises injecting a source metal into the reaction chamber or cell through the use of the carrier gas that is bubbled into the reaction chamber during a first pulse. In a preferred embodiment, this pulse is 1–20 seconds in duration, as shown in FIG. 1 and in block 20 of FIG. 2. In a preferred embodiment, the carrier gas is bubbled through water into the cell. In one preferred embodiment, the substrate is heated to a temperature of at least 210° C. prior to introducing the source metal. In a preferred embodiment, a copper source metal was heated to approximately 75° C.

In a preferred embodiment, the carrier gas is an inert gas. In another preferred embodiment, the carrier gas is argon. In another preferred embodiment, the carrier gas is hydrogen. In a preferred embodiment, the reducing agent is selected from a group consisting of alcohols and aldehydes. In another preferred embodiment, the reducing agent is selected from the group consisting of ethanol, isopropanol, and formaldehyde.

In one preferred embodiment the source metal comprises a copperI (CuI) or a copperII (CuII) compound. CuII sources are more thermally stable than CuI sources and are thus better suited for ALD processes. In another preferred embodiment, the source metal comprises a hydrated CuII compound, or other copper beta-diketonates. In another preferred embodiment, the source metal comprises an anhydrous copper compound. In another preferred embodiment, the source metal comprises a silverI or a silverII compound. In another preferred embodiment, the source metal comprises a silverII compound.

An inert gas is then injected into the cell during a second pulse. In a preferred embodiment, this pulse is 1–10 seconds in duration as shown in block 30 of FIG. 2. The inert gas pulsing step is used to purge excess source metal. In a preferred embodiment, the inert gas is selected from a group consisting of nitrogen, argon and helium.

The invention further comprises injecting a reducing agent into the cell during a third pulse. In a preferred embodiment, this pulse is 1–10 seconds in duration, as shown in block 40 of FIG. 2. In a preferred embodiment, the reducing agent is in a vapor form. The invention further comprises injecting an inert gas into the cell during the a fourth pulse. In a preferred embodiment, this pulse is 1–10 seconds in duration, as shown in block 50 of FIG. 2. This inert gas pulse is used to remove excess reducing agent. In a preferred embodiment, the inert gas is selected from a group consisting of nitrogen, argon and helium. In a preferred embodiment, where the source metal comprises silver, the inert gas of the second and fourth pulsing steps is argon.

Figure 6:
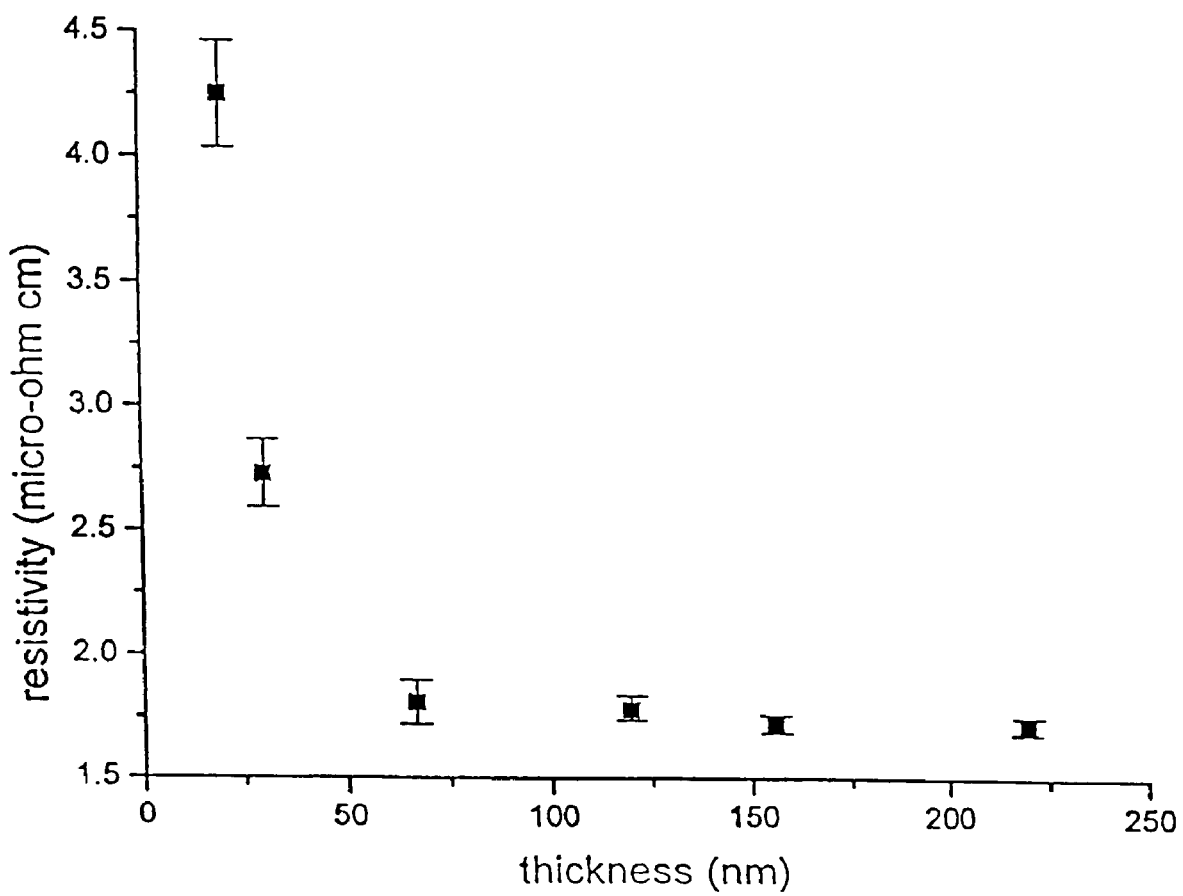
FIG. 6 is a graph depicting pulsing durations for a preferred embodiment of the present invention.

The above four pulsing steps may be used to deposit one monolayer using the method of the present invention. These four steps may be repeated for various selected source metals to deposit subsequent monolayers on the substrate. A preferred embodiment of the pulsing steps of the present invention is illustrated in the graph of FIG. 6.

In a preferred embodiment, $Cu(hfac)_2$ is introduced in a pulse that is 2–3 seconds in duration, carried by $H_2$ gas that has been bubbled through water. This is followed by a pulse of nitrogen gas of approximately one second in duration. The nitrogen pulse is used to remove any excess $Cu(hfac)_2$ and its byproducts. In this preferred embodiment, a pulse of reducing agent of approximately one second in duration is then introduced into the reaction chamber, using an $H_2$ carrier gas. The pulse duration can be varied by adjusting the carrier gas flow rate. The reducing agent reacts with and reduces cooper oxide to copper. In this preferred embodiment, another pulse of nitrogen of approximately one second in duration is then introduced into the reaction chamber to remove excess reducing agent as well as the reducing reaction byproducts. Using this method, the film thickness is controlled by repeating this sequence for a desired number of cycles.

Figure 5A:
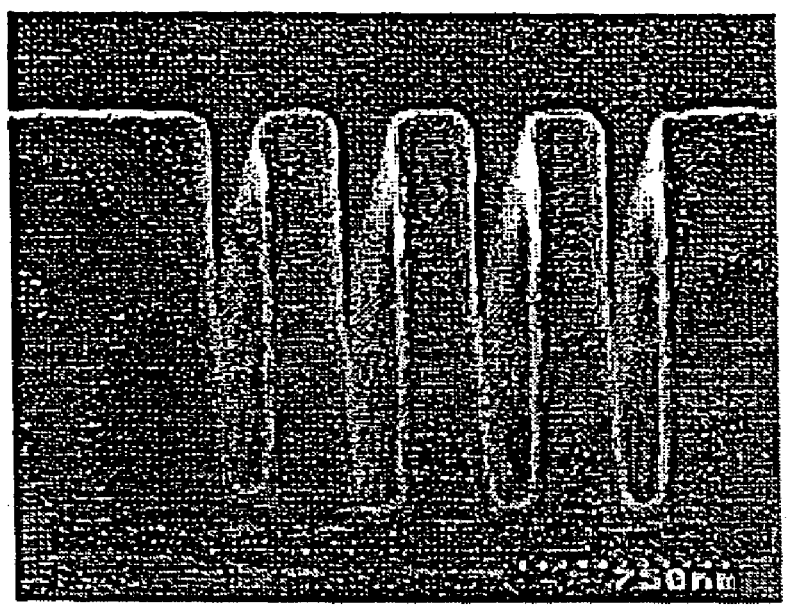
FIGS. 5a and 5b are scanning electron microscope cross sectional views of a Cu film deposited in trenches using a preferred method of the present invention.
Figure 5B:
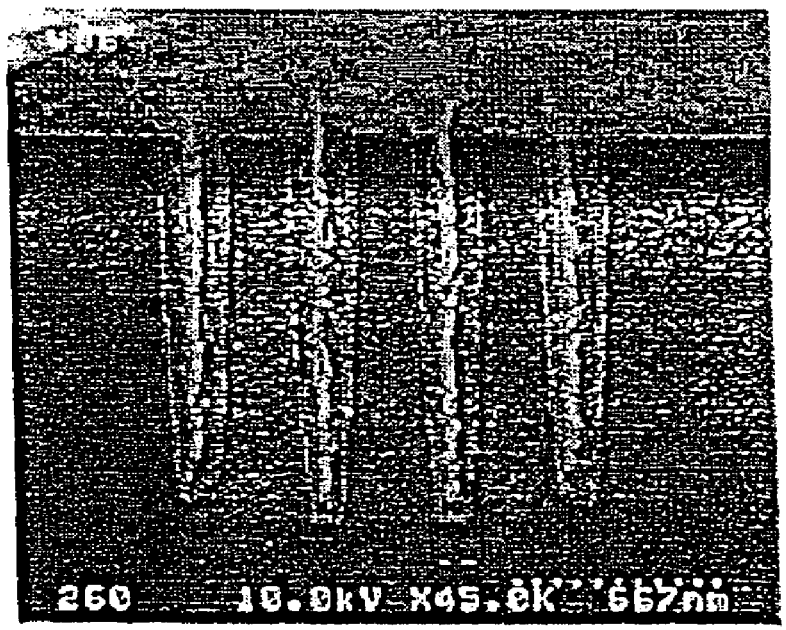

The present invention is applicable to the electrodeposition of copper films to be used as seed layers. FIGS. 5a and 5b depict scanning electron microscope cross sectional views of an electrode deposited copper layer entrenches. As shown in FIGS. 5a and 5b, the deposited copper completely fills these structures leaving no observable voids.

The invention is also directed toward a method for etching copper films on a substrate. This process is the reverse chemistry of the deposition process invented. This method comprises placing a substrate having a temperature in the range of 120° C. to 300° C. and comprising and upper surface, a lower surface, and silicon in a reaction cell where at least one of the surfaces is coated with a copper layer, as shown in block 60 of FIG. 3.

Figure 3:
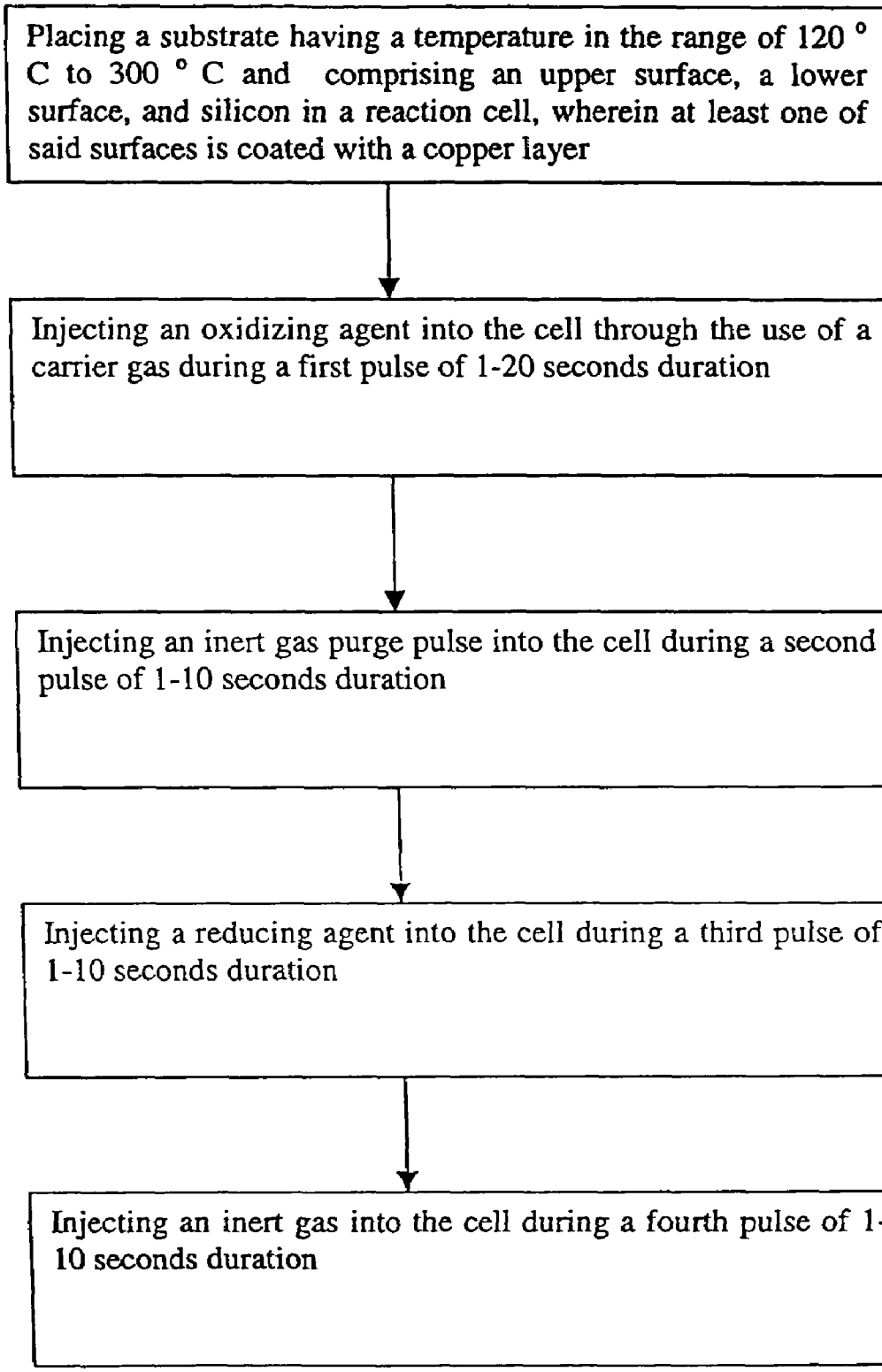
FIG. 3 is a block diagram of a second embodiment of the present invention.
Figure 4:
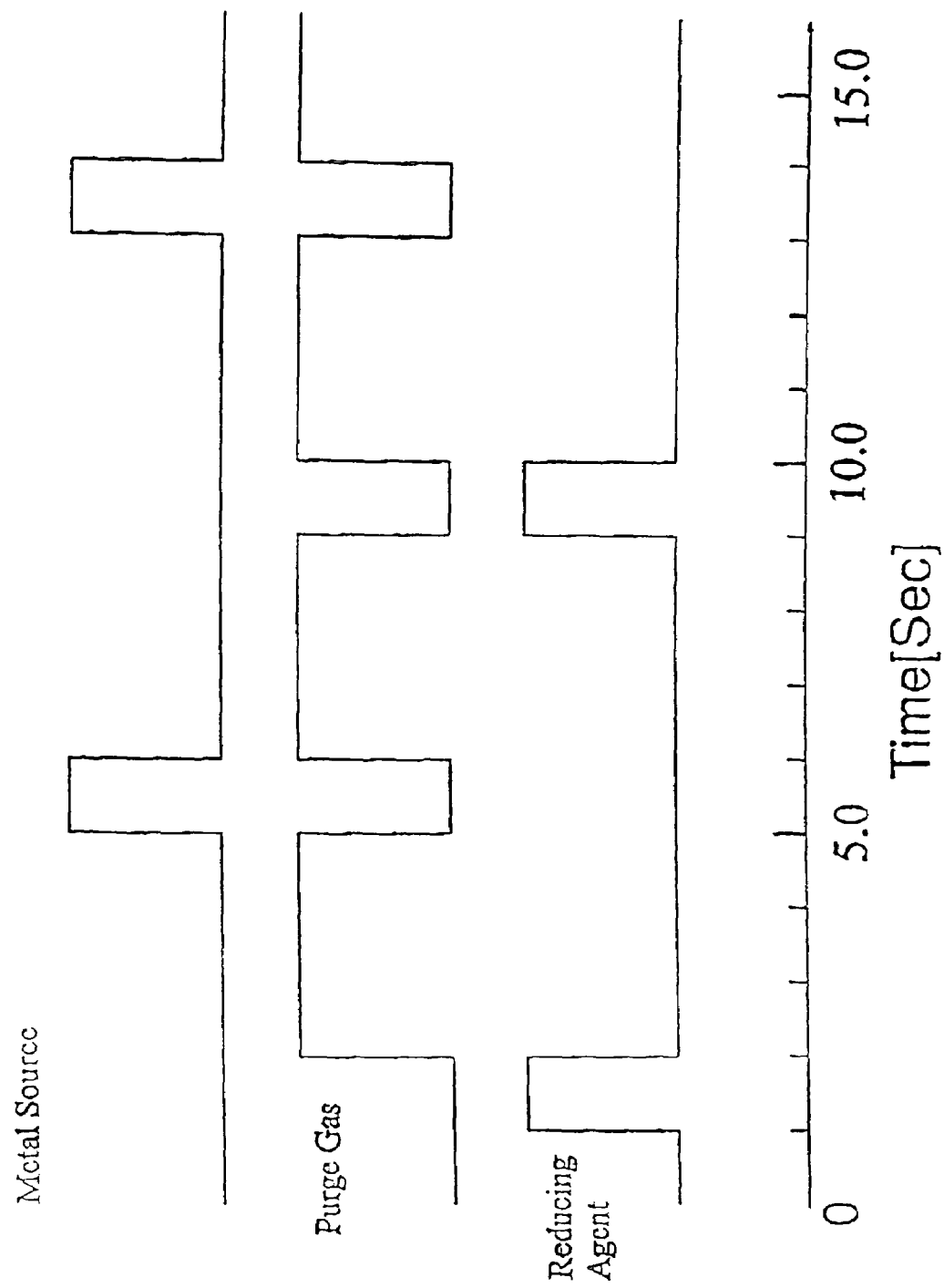
FIG. 4 is a graph depicting resistivity versus thickness for a Cu film applied using a preferred embodiment of the present invention.

The invention further comprises injecting an oxidizing agent into the cell through the use of a carrier gas for a first pulse of 1–20 seconds duration, as shown in block 70 of FIG. 3. In one preferred embodiment, the oxidizing agent is a gas comprising oxygen. In another preferred embodiment the oxidizing agent is water in a gaseous phase.

This embodiment of the invention further comprises injecting a nitrogen purge pulse into the cell during a second pulse of 1–10 seconds duration, as shown in block 80 of FIG. 3. A reducing agent is then injected into the cell during a third pulse of 1–10 seconds duration, as shown in block 90 of FIG. 3. In a preferred embodiment, the reducing agent is hydrogen hexafluoroacetylacetonate (H(hfac)).

The invention further comprises injecting nitrogen into the cell during a fourth pulse of 1–20 seconds duration, as shown in block 100 of FIG. 3.

The foregoing disclosure and description of the invention are illustrative and explanatory. Various changes in the size, shape, and materials, as well as in the details of the illustrative construction may be made without departing from the spirit of the invention.

What is claimed is:

1. A method for etching copper films on a substrate, the method comprising the steps of:
   a. placing a substrate having a temperature in the range of 120° C. to 300° C. and comprising an upper surface, a lower surface, and silicon in a reaction cell, wherein at least one of said surfaces is coated with a copper layer;
   b. injecting an oxidizing agent into the cell through the use of a carrier gas during a first pulse of 1–20 seconds duration;
   c. injecting a purge pulse comprising an inert gas into the cell during a second pulse of 1–10 seconds duration;
   d. injecting a reducing agent into the cell during a third pulse of 1–10 seconds duration; and
   e. injecting an inert gas into the cell during a fourth pulse of 1–10 seconds duration, wherein the steps a. through e. are sequentially performed over time.

2. The method of claim 1, where in the reducing agent is hydrogen hexafluoroacetylacetonate (H (hfac)).

3. The method of claim 1, wherein the oxidizing agent is a gas comprising oxygen.

4. The method of claim 1, wherein the oxidizing agent is water in a gaseous phase.

5. The method of claim 1, wherein said insert gas is selected from a group consisting of nitrogen, argon and helium.

6. A method for etching copper films on a substrate, the method comprising the steps of:
   a. placing a substrate having a temperature in the range of 120° C. to 300° C. and comprising an upper surface, a lower surface, and silicon in a reaction cell, wherein at least one of said surfaces is coated with a copper layer;
   b. injecting an oxidizing agent into the cell through the use of a carrier gas during a first pulse of 1–20 seconds duration;
   c. injecting a purge pulse comprising an inert gas into the cell during a second pulse of 1–10 seconds duration;
   d. injecting a reducing agent comprising hydrogen into the cell during a third pulse of 1–10 seconds duration; and
   e. injecting an inert gas selected from a group consisting of nitrogen, argon and helium into the cell during a fourth pulse of 1–10 seconds duration, wherein the steps a. through e. are sequentially performed over time.

7. The method of claim 6, wherein the oxidizing agent is a gas comprising oxygen.

8. The method of claim 6, wherein the oxidizing agent is water in a gaseous phase.

* * * * *